United States Patent
Ludwig et al.

(10) Patent No.: US 6,754,979 B2
(45) Date of Patent: Jun. 29, 2004

(54) DEVICE FOR DRYING AND THERMALLY TREATING GRANULATES WITH AN INERT GAS STREAM

(75) Inventors: Alfons Ludwig, Höxter (DE); Ragnhild Pille, Neustadt (DE); Gunter Pipper, Bad Dürkheim (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 10/130,250

(22) PCT Filed: Nov. 29, 2000

(86) PCT No.: PCT/EP00/11972

§ 371 (c)(1),
(2), (4) Date: May 16, 2002

(87) PCT Pub. No.: WO01/39947

PCT Pub. Date: Jun. 7, 2001

(65) Prior Publication Data

US 2003/0000100 A1 Jan. 2, 2003

(30) Foreign Application Priority Data

Nov. 30, 1999 (DE) .......................................... 199 57 664

(51) Int. Cl.[7] ................................................. F26B 3/08
(52) U.S. Cl. .............................. 34/372; 34/436; 34/505; 34/576; 34/228; 528/503
(58) Field of Search ............................ 34/372, 436, 505, 34/576, 168, 228; 528/481, 502 R, 503

(56) References Cited

U.S. PATENT DOCUMENTS

| | | | | |
|---|---|---|---|---|
| 4,439,933 A | * | 4/1984 | Dietrich et al. ................. | 34/65 |
| 4,584,366 A | * | 4/1986 | Gerking et al. ................ | 528/502 |
| 4,974,336 A | * | 12/1990 | Hahn .............................. | 34/22 |
| 5,362,844 A | * | 11/1994 | Kerpes et al. .................. | 528/308.5 |
| 5,558,678 A | * | 9/1996 | Weger .......................... | 23/295 R |
| 5,797,989 A | * | 8/1998 | Geissbuehler et al. ......... | 117/200 |
| 6,374,510 B1 | | 4/2002 | Geissbuehler et al. ........ | 34/232 |

FOREIGN PATENT DOCUMENTS

| | | |
|---|---|---|
| DE | 1 604 817 | 5/1970 |
| DE | 25 20 304 | 1/1977 |
| DE | 32 24 903 | 1/1984 |
| DE | 43 26 105 | 2/1994 |
| DE | 197 43 461 | 4/1999 |
| DE | 197 43461 A 1 * | 4/1999 |
| EP | 0 002 717 | 7/1979 |
| EP | 0 864 409 | 9/1998 |
| EP | 864 409 | 9/1998 |
| FR | 1327493 | 4/1963 |
| FR | 2284845 | 4/1976 |
| GB | 2 269 593 | 2/1994 |

* cited by examiner

Primary Examiner—Henry Bennett
Assistant Examiner—Camtu Nguyen
(74) Attorney, Agent, or Firm—Keil & Weinkauf

(57) ABSTRACT

An apparatus (1) is proposed for drying and heat-treating pellets with a stream of inert gas, wherein the apparatus has a cuboid base unit (2) with a feed (3) for the pellets in its upper part and an outlet (4) in its lower part, with a feed (5) on one lateral surface and with an exhaust base (6) on the opposite lateral surface of the cuboid base unit (2) for the stream of inert gas, and also with distribution and retention equipment (7, 8) in the region of the feed (5) and, respectively, of the exhaust (6) for the stream of inert gas, where each of these extends essentially over the entire vertical cross section of the cuboid base unit (2).

6 Claims, 4 Drawing Sheets

DEVICE FOR DRYING AND THERMALLY TREATING GRANULATES WITH AN INERT GAS STREAM

The invention relates to an apparatus for drying and heat-treating pellets with a stream of inert gas, to a process for drying polycondensate pellets in the solid phase using the apparatus of the invention, to a system for drying and postcondensing polycondensate pellets in the solid phase with at least one apparatus of the invention, and also to a use.

Polycondensates, predominantly prepared by melt polycondensation, have to be dried and generally subjected to posttreatment to remove monomers and oligomers, and also to postcondensation to increase molecular weight.

A proven device for drying and postcondensing polyamide pellets is the tower dryer described in DE-A 2 530 304, for example, also termed an annealing tower. The tower dryer is a tall cylindrical device through which polycondensate pellets are passed from the top to the bottom and a hot inert gas, frequently nitrogen, is passed in countercurrent. The polycondensate pellets are generally moist, since in an upstream process step they have been subjected to water washing in order to reduce the content of oligomers and monomers. What takes place in the tower dryer is firstly drying of the pellets and secondly heating of the pellets to a product-specific temperature for solid-phase condensation. The stream of inert gas emerging at the head of the tower dryer is cleaned of dust and, by cooling below the dew point, of moisture. It is passed back into the tower dryer after heating and, if desired, after removal of traces of oxygen. The location at which the inert gas is fed into the tower dryer is primarily a function of the diameter of the tower: specifically, the bed height above the gas entry has to be sufficient to ensure sufficiently uniform distribution of the stream of inert gas. In practice, the lower limit for the ratio of bed height to tower diameter is from 1.3 to 2. Substantially uniform distribution of the stream of inert gas is a precondition for very uniform drying of the pellets, and this in turn is important for very low variation in the viscosity number from grain to grain. The large bed height in the drying zone, relative to the tower diameter, is a result of the requirement for substantially uniform distribution and means that, particularly for high drying or annealing temperatures, the residence times for the pellets are many times greater than the residence time required by the kinetics of drying. In addition, the high pressure loss requires a corresponding blower rating, with relatively high energy costs. Another disadvantage of the tower dryer is that the amount of inert gas is restricted by the fluidization point of the pellets. In order not to exceed the fluidization point, therefore, high-capacity systems have to be designed with correspondingly large tower diameters. However, these large tower diameters make it more difficult to achieve plug flow in the tower dryer, and this flow is important for low variation in viscosity number from grain to grain. The large tower diameters, taken together with the uniform distribution of the stream of inert gas, also increase the abovementioned energy costs.

Another disadvantage of carrying out drying and annealing in a single device, for example a tower dryer such as that described in DE-A 2 530 304, is low flexibility in relation to changes in throughput or residence time, and also in relation to the preparation of products with different molar mass and/or under different annealing conditions.

DE-A 4 326 105 therefore proposes a device for preheating and drying upstream of the tower dryer, thus decoupling the drying process and the annealing process. This proposal provides two fluidized-bed devices upstream of the tower device, the first of these having an effervescent fluidized bed and the second having a fluidized bed with plug-flow characteristics. In continuously operating fluidized beds, the product to be dried is generally placed on an inflow plate, frequently a perforated plate, a bar screen or a specifically designed plate, where the hot drying gas passes through the product from the bottom to the top. The gas velocity set here is such that the product is held in flotation, but not pneumatically conveyed or discharged. The moving product behaves like a liquid. If the product is fed continuously on one side, it flows out from the discharge opening on the other side. The gas therefore has a number of tasks: it is firstly responsible for fluidizing and secondly serves as a medium for heat transfer and mass transfer. The intensive heat transfer and mass transfer in fluidized-bed devices makes them fundamentally suitable for rapid heating and drying. However, in the case of products with slow drying kinetics, for example nylon-6, the gas flow needed for product transport is insufficiently utilized, and therefore the use of fluidized-bed devices in such cases is not very cost-effective.

A further disadvantage of fluidized-bed devices is that the product residence time distribution is broader than in the tower dryer, due to well-developed fluidization. As a result, the moisture content of the product is non-uniform at the exit from the fluidized-bed device, and therefore at the entrance to the downstream holding device. The solid-phase condensation in the holding device for further increasing the molar mass downstream is highly susceptible to non-uniform moisture content of the pellets entering. This results in variations in relative viscosity from grain to grain, and these impair product quality, for example for high-speed spinning. Another disadvantage of fluidized-bed devices is the relatively severe mechanical stress placed on the pellets due to fluidization and the resultant formation of dust.

It is an object of the present invention, in contrast, to provide a device which serves for drying and heat-treating pellets with a stream of inert gas, and which is more cost-effective, and which ensures that the product residence time distribution is narrow, that the flow rate of inert gas is markedly increased due to lack of any dependency on a fluidization point, and consequently that capacity is markedly increased. In addition, a process should be provided which decouples the drying process and the annealing process and avoids the disadvantages of the known processes.

We have found that this object is achieved by an apparatus for drying and heat-treating pellets with a stream of inert gas. The apparatus of the invention has a cuboid base unit with a feed for the pellets in its upper part and an outlet in its lower part, with a feed on one lateral surface and with an exhaust on the opposite lateral surface of the cuboid base unit for the stream of inert gas, and also with distribution and retention equipment in the region of the feed and, respectively, of the exhaust for the stream of inert gas, where each of these extends essentially over the entire vertical cross section of the cuboid base unit.

We have found that the process object of the invention is achieved by means of a process for drying polycondensate pellets in the solid phase, by a. in one or more devices, drying the polycondensate pellets and heating the same at between a minimum temperature of 105–120° C. and a maximum temperature 2° C. below their softening point, b. then treating the same in a holding device, and c. then cooling the same in a cooling device, and selecting an apparatus of the invention, at least as the device(s) in stage a.

Pellets usually have the form of grains with a particle size of from 1.5 to 5 mm, in particular from 2 to 3 mm. The pellets may be cylindrical, spherical or lenticular. The pellets used according to the invention are preferably polycondensate pellets, in particular polyester pellets or polyamide pellets.

Polycondensates are polymers prepared by condensing monomers with elimination of low-molecular-weight compounds. Polycondensates, preferably polyesters or polyamides, are known to the skilled worker and have been described many times in the literature, and no more detailed information is therefore needed here.

It is preferable to use semicrystalline polycondensates.

Preferred polyamides are polycaprolactam (nylon-6), polyhexamethyleneadipamide (nylon-6,6), copolymers of these, or else partly aromatic copolyamides based on terephthalic acid and, if desired, isophthalic acid, 5-sulfoisophthalic acid, adipic acid, hexamethylenediamine and caprolactam.

Preferred polyesters are polyalkylene terephthalates, in particular polyethylene terephthalate (PETP) and polybutylene terephthalate (PBTP).

In one preferred embodiment, the polycondensates used comprise fillers, reinforcing agents and conventional additives and processing agents, the amounts generally being from 0.1 to 90% by weight, preferably from 10 to 75% by weight and particularly from 20 to 70% by weight, based on the polycondensate.

The polycondensates used may be low-molecular-weight polymers intended for reaction to give high-molecular-weight polymers, particularly if fillers and/or other additives have previously been added to these low-molecular-weight polymers (direct compounding). Higher-molecular-weight polymers intended for adjustment to a desired (final) molecular weight, particularly in pursuance of a secondary processing step, are also accessible. Molecular weight changes, e.g. molecular-weight-increase or degradation reactions, may take place during the processing step, for example due to energy introduction or shear, or chemical reaction with additives.

The drying and heat-treatment takes place with a stream of inert gas. The inert gases present may in particular be nitrogen or superheated steam. For energy-related reasons it is preferable to use superheated steam, i.e. steam at from 120 to 230° C. It is preferable for the inert gas to be recirculated, the stream of inert gas emerging from the apparatus being passed through dust-removal equipment, such as a cyclone or filter, and, after reheating, being reintroduced into the apparatus. If the inert gas used comprises steam, the excess steam is discharged (partial discharge). If nitrogen is used, the entire stream of inert gas is run through a condensation cooler or a scrubbing column, so that it is cooled and any water present condensed out.

The apparatus has a cuboid base unit, the shape of which is determined by the lateral surface subjected to the stream of inert gas and by the width of the apparatus measured perpendicular to this lateral surface. The width, in combination with the flow of inert gas, has a direct effect on the pressure loss arising through the bed of pellets within the device, and thus on the energy costs incurred. For throughputs of pellets relevant to industry, the width of the device is generally greater than 0.1 m, preferably greater than 0.2 m. Rising energy costs place an upper limit on the width, which is usually not more than 1 m, preferably 0.6 m and particularly preferably 0.4 m.

The geometric dimensions of the apparatus (device width and lateral surface area supplied with inert gas), and also the throughput of inert gas through the apparatus, can be regarded as three independent variables for a given throughput of pellets and for a given fall in moisture level within the apparatus. Criteria which play an important part in determining these are in particular optimization with respect to energy costs and design requirements, and also the temperature level desired or required for the downstream solid-phase condensation.

For industrially relevant throughputs of pellets, generally from 300 to 12 000 kg/h, and for a given fall in moisture level, which, particularly for polyamide pellets, is generally from an initial moisture level of from about 11 to 15% by weight to below 1% by weight, in particular to below about 0.2% by weight, and at industrially relevant throughputs of inert gas of from about 2000 to 100 000 $Nm^3/h$, and at a device width, limited by the energy costs which have to be met, of from 0.1 to 1 m, preferably from 0.2 to 0.6 m, particularly preferably from 0.2 to 0.4 m, the dimensions for that lateral surface of the cuboid base unit in contact with inert gas are from 1 to 50 $m^2$, preferably from 1 to 30 $m^2$. Higher throughput of pellets result in correspondingly larger amounts of inert gas and also, where appropriate, larger lateral surface areas of the cuboid base units.

The following example illustrates the dimensioning of the apparatus as a function of a given drying task:

Based on a throughput of 4000 kg/h of pellets and on lowering the moisture content from 11 to 0.2% by weight at a drying temperature of 180° C., with a throughput of 25 000 $Nm^3/h$ of inert gas and a preselected device width of 0.3 m, the resultant surface area required to receive the stream of inert gas is 18 $m^2$. The residence time resulting from the throughput of pellets and from the volume of the device is 53 minutes. If the amount of gas is increased to 40 000 $Nm^3/h$, while the remaining parameters remain unchanged, the surface area required to receive the stream of gas is only 10 $m^2$, and the residence time falls to about 30 minutes.

If the device width is lowered, the surface area required to receive the stream of gas rises drastically: for example, at a device width of 0.1 m and with other drying parameters unchanged, the surface areas required to receive the stream are 150 $m^2$ (at a throughput of 25 000 $Nm^3/h$ of inert gas) and, respectively, 95 $m^2$ (at a throughput of 40 000 $Nm^3/h$ of gas).

When superheated steam is used, as is advantageous for cost-effectiveness, the flow of inert gas is usually from about 2 to 8 kg of steam per kg of pellets, preferably from about 4 to 6 kg of steam per kg of pellets. Lower throughputs of steam lead to steam temperatures below 100° C. in the product-entry region. This causes water to condense on the product and is undesirable.

The distribution and retention equipment in the region of the feed and exhaust for the stream of inert gas serves for uniform gas distribution, and also for retention of the pellets. Each of these pieces of equipment extends essentially over the entire vertical cross section of the cuboid base unit, and they are preferably vertical plates penetrated by passages. The vertical plates penetrated by passages are preferably perforated sheets or bar screens. Use may be made of CONIDUR® fine-perforation sheets or RIMA® or CORIMA® bar screens from Hein, Lehmann Trenn-und F ördertechnik GmbH. The design of the distribution and retention equipment in the region of the feed for the stream of inert gas is such that the pressure loss is from about 10 to 50 mbar and thus markedly over 10% of the pressure loss for the entire bed of pellets. The second piece of distribution and retention equipment, arranged in the region of the exhaust for the stream of inert gas, may have been designed for lower pressure losses; only minimal mechanical strength is required here, to prevent pellets from escaping. At customary pellet grain dimensions of from about 2 to 3 mm, the plates selected are those perforated by passages of dimensions from 0.5 to 1 mm, while finer pellets correspondingly require the use of plates perforated by smaller passages.

In one preferred embodiment, the flow of inert gas is set to reduce from the top to the bottom over the vertical cross-section of the cuboid base unit. The reduction here in the flow of inert gas may be either continuous or else preferably discontinuous. The reduction in the flow of inert gas from the top to the bottom reduces the amount of inert gas required for an identical drying task, with a corresponding improvement in cost-effectiveness. The following example illustrates this: based on a throughput of 4000 kg/h of pellets and a lowering of the moisture content from 11 to 0.2% by weight at a drying temperature of 180° C., and with a dryer width of 0.4 m, and with a surface area of 10 $m^2$ to receive the stream, a constant stream of 25 000 $Nm^3/h$ of inert gas is required. The same drying task can also be achieved with three substreams of inert gas, reducing over the height of the apparatus from the top to the bottom, specifically a first substream of 10 800 $Nm^3/h$ of inert gas in the upper region with a velocity 1.16 m/sec, a second substream of 4000 $Nm^3/h$ of inert gas in the central region with a velocity of 0.65 m/sec, and a third substream of 3600 $Nm^3/h$ of inert gas in the lower region of the apparatus with a velocity of 0.58 m/sec. The total flow of gas required can thus be reduced from 25 000 to 18 400 $Nm^3/h$. The resultant energy saving is about 10%.

In another preferred embodiment, the stream of inert gas is fed, in each case via distribution and retention equipment, to one lateral surface of two or more cuboid base units arranged in parallel, and exhausted, in each case via distribution and retention equipment, at the opposite lateral surface in each case. The parallel arrangement of at least two cuboid base units makes it possible to divide the stream of pellets among the units and thus to ensure that the design of the apparatus is compact. The stream of inert gas is divided among the cuboid base units supplied with pellets, then brought together again after passing through the beds of pellets, and then passed through the joint dust-removal system, for example using a cyclone, by way of a blower and a heater.

The invention also provides a continuous process for drying polycondensate pellets in the solid phase, by
a. in one or more devices, drying the polycondensate pellets and heating the same at between a minimum temperature of 105–120° C. and a maximum temperature 2° C. below their softening point,
b. then treating the same in a holding device, and
c. then cooling the same in a cooling device, and selecting an apparatus of the invention, at least as the device(s) in stage a.

After their preparation, polycondensates and particularly polyamide condensates still comprise residual monomers, and also linear and cyclic oligomers. The content of residual monomers and oligomers is generally below 2%, but can in individual cases be substantially higher, particularly for hydrolytic melt polymerization, where contents of from 9 to 12% are generally encountered. Since the residual monomers and oligomers cause problems in the downstream stages of processing, in particular through formation of deposits and coatings on the devices used, the residual monomers and oligomers have to be removed, usually by extraction, particularly by countercurrent extraction with water. The pellets downstream of the extraction stage are therefore moist and in the case of nylon-6 pellets generally have a water content of from 11 to 15% by weight, in particular from 12 to 14% by weight. To avoid any hydrolytic degradation during the processing downstream, the moist polycondensate pellets have to be thoroughly dried, desirable moisture contents being not more than about 0.1% by weight.

It has been found that moist polycondensate pellets can be dried in the solid phase with a stream of inert gas in an apparatus of the invention, the pellets and the inert gas being conducted in crossflow. The moist polycondensate pellets here are heated to a temperature between a minimum temperature of 105–120° C. and a maximum temperature 2° C. below their softening point, this softening point being defined as the temperature at which more than 2% of all the particles have agglomerated, sintered or developed interlocked surfaces. The softening point of the polycondensate is substantially dependent on its chemical structure and degree of crystallinity, and also on the nature and amount of additives. In the case of nylon-6 the softening point is generally at or above about 190–195° C. The abovementioned fall in moisture level is achieved by appropriate setting of the residence time of the pellets in the crossflow device of the invention. For example, nylon-6 pellets can be dried from an initial moisture level of from 11 to 15% by weight to a moisture content of about 1% by weight in a crossflow device of the invention in about 30 minutes at from 180 to 195° C. Longer residence times give correspondingly lower moisture contents. The drying kinetics are temperature-dependent: lower temperatures require longer residence times.

Particularly for large-scale systems, it can be advantageous to arrange two or more crossflow devices in series with intermediate heating of the stream of inert gas, thus improving the distribution of inert gas and improving the uniformity of the heating and drying of the pellets.

The extensively dried, heated pellets then pass into a holding device, where solid-phase condensation brings about a further increase in molar mass and the pellets are post-dried, in the case of nylon-6 particularly to a residual moisture level below 0.06% by weight.

The holding device used may advantageously comprise a tower dryer through which the polycondensate flows under gravity. Various residence times can be set via the level of pellets in the tower, and thus products can be prepared with different molecular weights at a high temperature level.

In the tower dryer it is expedient to exclude atmospheric oxygen by running a gentle stream of fresh nitrogen through the device in countercurrent to the polycondensate.

However besides this method of operation with what is known as an inactive tower, i.e. with only a gentle stream of nitrogen, it is possible to use what is known as an active tower, with additional circulation of inert gas. In this case it is possible either to link the inert gas circuits of crossflow device and tower device with one another, or else to operate these separately.

This version of the process with an active tower dryer is particularly of interest for increasing the capacity of existing tower dryers by using an additional, upstream crossflow dryer.

The sole task of the crossflow dryer is then to dry the pellets from an initial moisture level of about 12% to a moisture level of about 6%.

In the downstream tower dryer, with its own gas circuit (or linked to the crossflow dryer) there is then further drying to moisture contents below 0.06% by weight.

The dimensioning of the crossflow dryer for a drying task of this type may be illustrated by the following example: Taking a tower dryer with a throughput of 4000 kg/h of pellets and with an initial moisture level of 12% by weight for the pellets, and with a final moisture level of 0.06% by weight, arranging a crossflow dryer upstream can increase the throughput through the tower dryer to 8000 kg/h for the same initial and final moisture levels. The crossflow dryer here has a width of 0.4 m, a surface area of 5 m$^2$ to receive the flow, and a volume flow of 11 000 Nm$^3$/h of steam at a steam entry temperature of 180° C. The moisture level of the pellets is lowered here in the crossflow dryer from 12 to 6% by weight.

The polycondensate pellets leaving the holding device are then cooled (process stage c) in a cooling device, and according to the invention a crossflow device is used for this purpose. The temperature of the polycondensate pellets here is generally lowered to 30–60° C., preferably 40–50° C. The cooling gas used may be any gas or gas mixture usual for this purpose, in particular nitrogen or air, preferably air.

The invention also provides a system for drying and postcondensing polycondensate pellets in the solid phase with at least one crossflow device for drying and heating the polycondensate pellets used with a holding device connected thereto, particularly a tower dryer, and also with a cooling device, in particular a cross-flow device.

The process and the system are particularly suitable for drying and postcondensing polycondensate pellets, in particular polyester pellets or polyamide pellets, particularly preferably nylon-6 pellets.

The crossflow device combines the advantages of the known tower devices and fluidized-bed devices: for example, as with the tower there is a narrow residence time distribution for the pellets. In addition, the thicknesses selected for the pellet layers in the drying zone can be very much lower than in a conventional tower dryer, since the distribution and retention equipment incorporated is efficient in achieving uniform gas distribution. As a result, the pressure losses are substantially lower, thus giving a lower required blower rating and finally lower energy costs.

The flow of inert gas may moreover be varied within wide boundaries, since, unlike in the fluidized-bed device, the pellets are not transported by the inert gas, but by gravity. The lower limit for the flow of inert gas here depends on the thickness selected for the layer of pellets, on the throughput of pellets, on the specified parameters for the fall in moisture level and the heating of the pellets.

Unlike in the known tower devices and fluidized-bed devices, the upper limit for the flow of inert gas is not given by the fluidization point of the pellets. The design features, particularly the distribution and retention equipment, enable the amount of inert gas to be raised above the amount of inert gas associated with the fluidization point of the pellets.

The decoupling of drying and postcondensation, and the intensive mass transfer and heat transfer in the crossflow device permit the two process steps, drying and postcondensation, to be operated at a very high temperature level. The fact that the residence time for the pellets in the holding device can be varied means that this is also possible with low-molecular-weight fiber precursors, with the following advantages: firstly, drying and postcondensation can be made considerably faster than in the prior art, even, in particular, for low-molecular-weight fiber precursors. In contrast to processes in known tower devices, with residence times of from 20 to 30 hours, the time for drying and postcondensation can be reduced to about 5 to 12 hours. In this way, higher throughput of pellets can be achieved without any need to enlarge the diameter of the tower device for postcondensation. This makes it easier to ensure that there is plug flow of the pellets, and product quality therefore improves as a consequence of lower viscosity variations from grain to grain.

The intensive heating in the crossflow device, allowing the moist pellets to be heated to very high temperatures within a few minutes, and also in the holding device, which is operated at a high temperature level, bring about a surprisingly marked lowering of the oligomer content in the polycondensate pellets. This fall in content mainly takes place before the product leaves the crossflow device. Since even after an operating time of several months no oligomer deposits of any kind could be observed on the devices, pipelines or machinery of the system, it is assumed that the fall in oligomer content has taken place via reaction with the polymer chain.

This therefore affords an opportunity of providing products with particularly low oligomer content, and in particular caprolactam dimer content, with the corresponding performance advantages, in particular with reduction or elimination of the formation of spinning fume during fiber production, of the formation of coatings on moldings during injection molding, and of coatings on rolls during film production.

Another opportunity afforded is that of increasing throughput in the upstream extraction stage, since permissible contents of in particular caprolactam oligomers are higher than for known processes, because the content of these oligomers is further reduced during the drying and postcondensation carried out according to the invention. The fall in the content of caprolactam oligomers is in fact rate-determining for the extraction process, since the diffusion coefficients and solubilities of the oligomers are markedly lower than those of the monomers.

Another advantage of the crossflow device when compared with the devices known from the prior art is markedly lower energy costs. This may be illustrated in the following example:

To dry a 7 t/h flow of pellets from an initial moisture level of 12% by weight to about 0.2% by weight, the pressure loss brought about in a tower device with a diameter of 4.2 m and a pellet bed of height 5 m above the gas entry, using a flow of about 28 000 kg/h of inert gas through the pellet bed, is about 300 mbar, requiring a blower rating of about 400 kw.

In contrast, the same drying task can be achieved in a crossflow device with, for example, a width of 0.3 m, a surface area of 36 m$^2$ to receive the flow, and a flow of about 50 000 kg/h of inert gas, the pressure loss arising across the bed of pellets and the distribution and retention equipment being merely about 60 mbar. The blower rating required is then about 200 kW, and therefore energy costs are halved in comparison with the process in the conventional device.

The invention is further illustrated below using drawings and examples.

The details shown are as follows.

Figure 1:
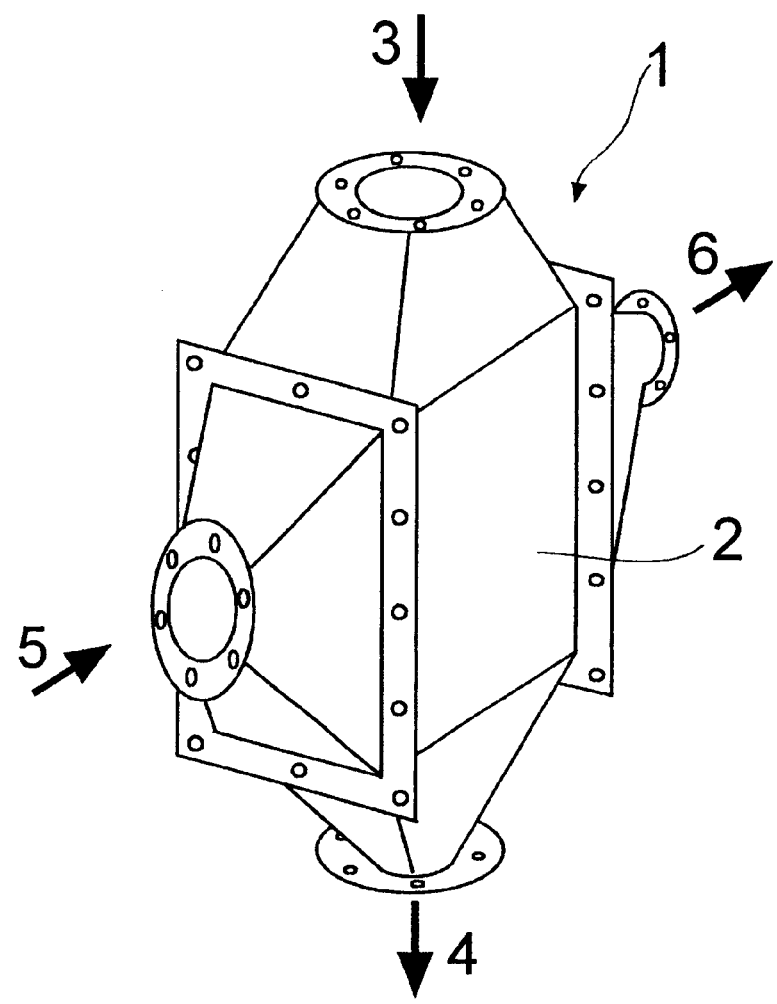
FIG. 1 shows a crossflow device of the invention.

The crossflow device 1 shown by way of example in FIG. 1 has a cuboid base unit 2 with a feed 3 for the pellets in its upper part and with an outlet 4 in its lower part, and also with a feed 5 on one lateral surface and with an exhaust 6 on the opposite lateral surface of the cuboid base unit 2, for the stream of inert gas.

Figure 2:
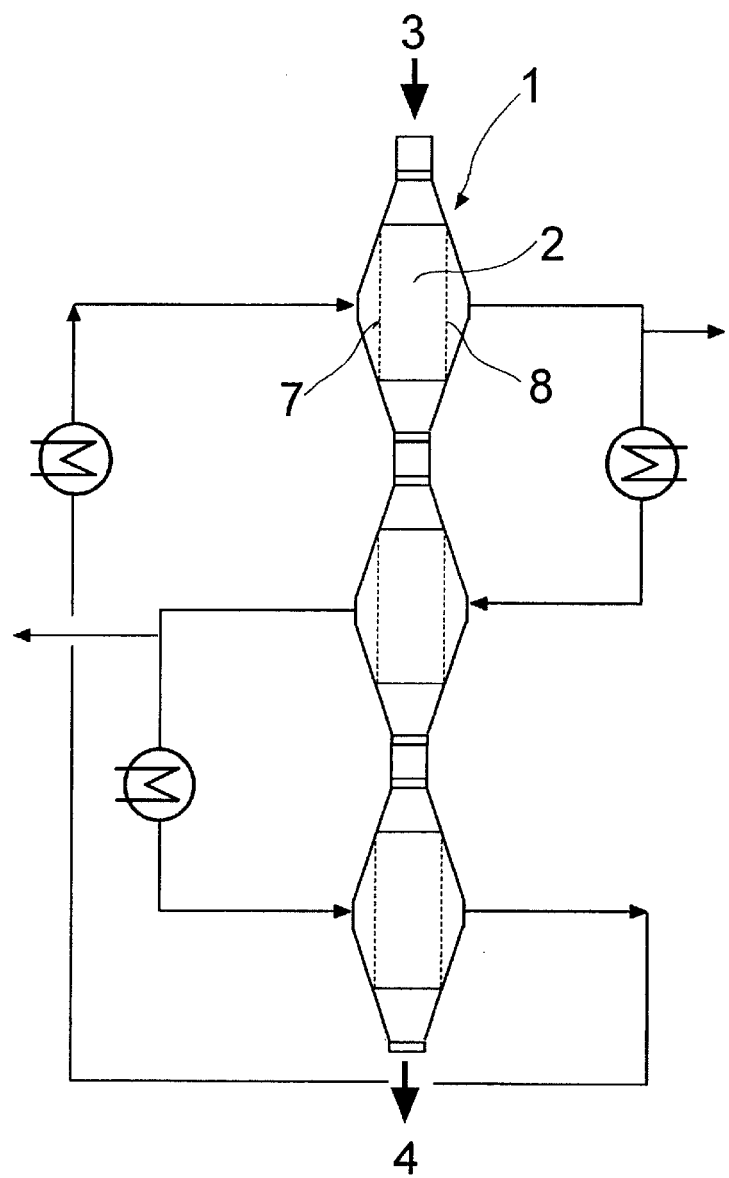
FIG. 2 is a diagram of an arrangement of 3 crossflow devices in series.

FIG. 2 is a diagram of an arrangement of crossflow devices 1 in series, three devices being shown by way of example. In the cross-sectional diagram of FIG. 2 it is also possible to see the distribution and retention equipment 7 and 8 which cannot be seen in FIG. 1, in the region of the feed 5 and, respectively, of the exhaust 6 for the stream of inert gas. The pellets are fed (reference number 3) to the upper part of the first crossflow device, flow through the first crossflow device under gravity and then flow through the other crossflow devices arranged in series, in each case from the top to the bottom, and leave the lower part of the last crossflow device at the outlet 4 for the pellets. The inert gas, in particular superheated steam, is preferably run in a circuit through the crossflow devices arranged in succession, with intermediate heaters arranged at suitable locations within the gas circuit, and with excess steam removed from the circuit as required.

Figure 3:
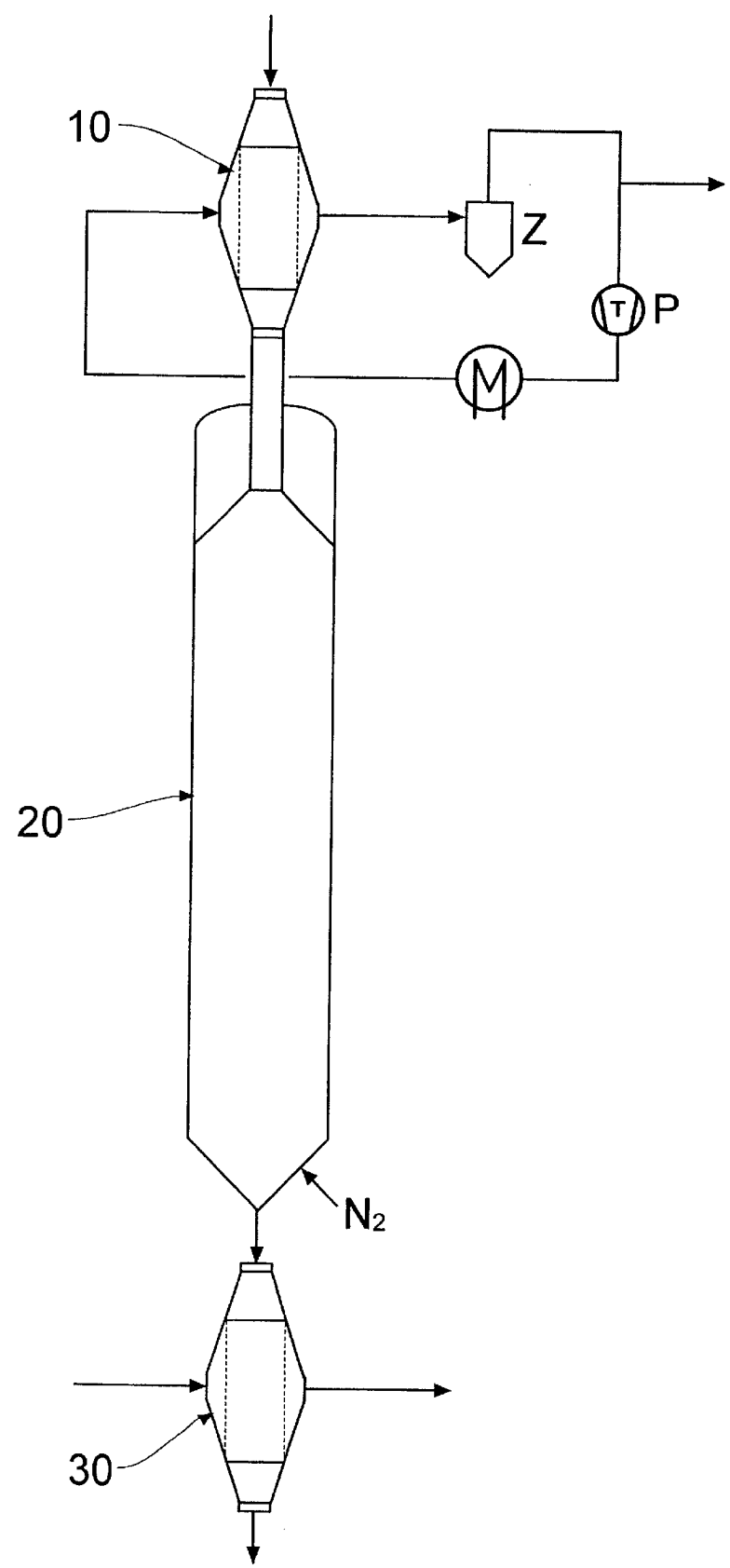
FIG. 3 is a diagram of a system for drying and postcondensing polycondensate pellets in the solid phase according to the invention.

FIG. 3 is a diagram of a system for drying and postcondensing polycondensate pellets in the solid phase: the moist pellets enter the upper part of a crossflow device 10 and are dried and heated in crossflow by a stream of inert gas, preferably superheated steam. The steam emerging from the crossflow dryer is, for example, subjected to dust removal by way of a cyclone Z and, after reheating in a heat exchanger, recirculated to the crossflow device 10. Excess steam is discharged from the inert gas circuit and condensed.

The dried pellets then pass into a tower device 20 and move through the same under gravity from the top to the bottom, in countercurrent against a gentle stream of nitrogen. Adjoining the tower device 20 there is a cooling device 30, likewise designed as a crossflow device. The pellets flow through the cooling device 30 under gravity from the top to the bottom and are cooled in countercurrent with a coolant gas, in particular air.

Figure 4A:
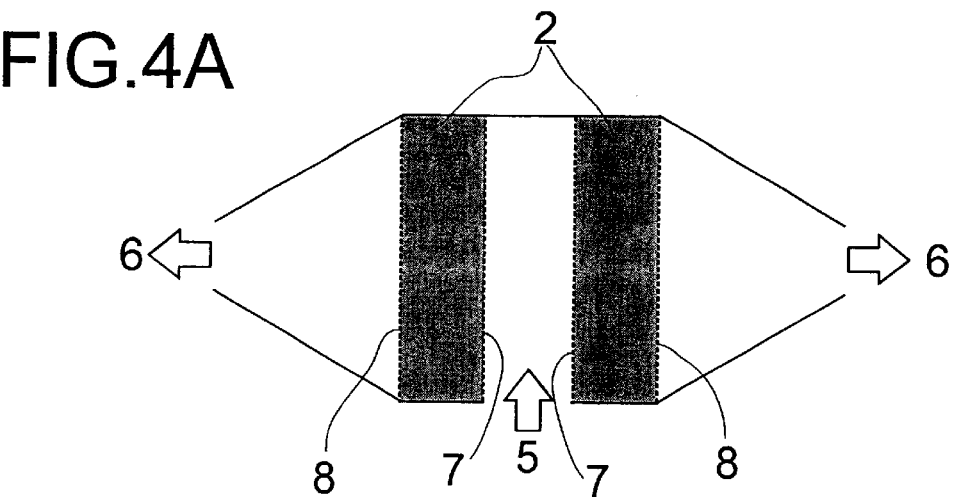
FIG. 4*a* shows two crossflow devices arranged in parallel.

FIG. 4a is a diagram of two crossflow devices arranged in parallel. The pellets are fed to the upper part, and discharged from the lower part, of each of the two cuboid base units 2. The two crossflow devices have a joint feed 5 for the stream of inert gas. The inert gas flows via distribution and retention equipment 7 into the pellets and flows via distribution and retention equipment 8 out from the pellets. Each of the substreams of inert gas emerging from the pellets is drawn off via the exhaust 6 and then preferably combined in a manner not illustrated.

Figure 4B:
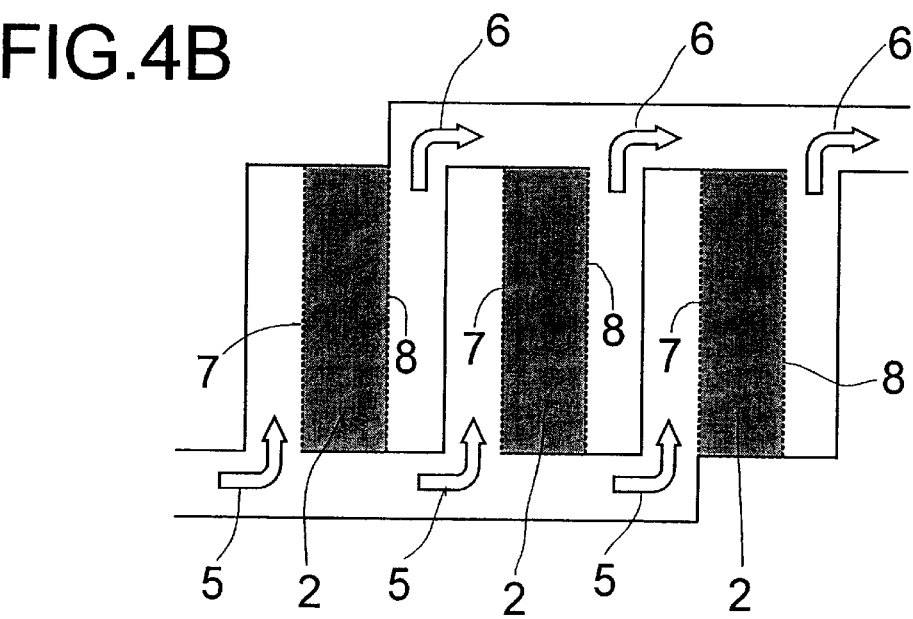
FIG. 4*b* shows three crossflow devices arranged in parallel.

FIG. 4b is a diagram of three crossflow devices arranged in parallel. The stream of inert gas is divided among three separate feeds 5 for each of the cuboid base units 2 supplied with pellets. Similarly, the three exhausts 6 for the stream of inert gas are combined to give a single stream.

EXAMPLES

The examples were carried out in a crossflow device as in FIG. 1 with the following dimensions for the cuboid base unit: width 250 mm, height 500 mm and depth 280 mm, i.e. with a lateral surface area of 0.125 $m^2$ supplied with inert gas.

The distribution and retention equipment used comprised CONIDUR® fine-perforation plates from Hein, Lehmann Trenn-und Fördertechnik GmbH, the fine-perforation plate in the region of the feed for the stream of inert gas (reference number 7 in FIG. 2) having the dimensions:

plate thickness: 0.5 mm, screen aperture: 0.6 mm, and free surface area: about 14%, and the fine-perforation plate in the region of the exhaust for the stream of inert gas (reference number 8 in FIG. 2) having the dimensions:

plate thickness: 0.75 mm, screen aperture: 0.8 mm, and free surface area: about 15%.

The volume of the cuboid base unit corresponding to the dimensions listed above was 35 l. With a weight of 650 kg/qm$^3$ for the bed of pellets, the content of pellets in the cuboid base unit was therefore about 23 kg.

Extracted cylindrical nylon-6 pellets of height about 3 mm and diameter about 2 mm and with an average grain weight of from 12.5 to 14.5 mg and with an initial moisture content of 13% by weight, and with a relative viscosity of 2.05, were continuously introduced into this crossflow device from above. The throughput of pellets was varied within the range from 25 to 75 kg/h, corresponding to a residence time of from 55 to 18 minutes in the crossflow device. A blower was used to pass superheated steam at 180° C. into the side of the crossflow device via a bar-screen plate. The stream of gas emerging from the other side was passed through a cyclone, subjected to dust removal and, after reheating, fed back into the crossflow device. Excess steam was discharged from the circuit and condensed. The amount of gas in circulation was varied within the range from 200 to 70 $m^3$/h. The gas pressure loss across the crossflow device was from 3 to 25 mbar, depending on the throughput of gas. Table 1 below lists the process parameters for the crossflow device and associated analytical data.

TABLE 1

| Pellet throughput [kg/h] | Pellet residence time [min] | Amount of inert gas [m³/h] | Inert gas temperature (entry) [° C.] | Inert gas temperature (exit) [° C.] | Pellet temperature (entry) [° C.] | Pellet temperature (exit) [° C.] | Pellet moisture content (entry) [% by weight] | Pellet moisture content (exit) [% by weight] |
|---|---|---|---|---|---|---|---|---|
| 25 | 55 | 164 | 180 | 137 | 25 | 178 | 13 | 0.15–0.18 |
| 25 | 55 | 140 | 180 | 132 | 25 | 178 | 13 | 0.11–0.17 |
| 25 | 55 | 102 | 180 | 105 | 25 | 178 | 13 | 0.62–0.67 |
| 37.5 | 37 | 200 | 180 | 138 | 25 | 179 | 13 | 0.40–0.42 |
| 37.5 | 37 | 162 | 180 | 118 | 25 | 179 | 13 | 0.60–0.63 |
| 37.5 | 37 | 144 | 180 | 115 | 25 | 178 | 13 | 0.73–0.76 |
| 50 | 28 | 200 | 180 | 119 | 25 | 175 | 13 | 0.92–0.94 |
| 50 | 28 | 181 | 180 | 116 | 25 | 174 | 13 | 1.02–1.03 |
| 75 | 18 | 184 | 180 | 101 | 25 | 168 | 13 | 2.20–2.39 |

The pellets emerging from the crossflow device were then transferred to a tower device for postcondensation at 178° C.

with a residence time of 6 hours. The tower device was heated only by conserving heat, i.e. no further energy was introduced from outside. For postdrying, a small amount of fresh nitrogen, about 1 m³/h, was fed into the conical region of the tower device. Finally, the pellets were fed to a second crossflow device and cooled to 50° C. within a period of 5 minutes, air being used as coolant gas.

After postcondensation in the tower device, the relative viscosity was 2.47 and the residual moisture content 0.01% by weight.

We claim:

1. A continuous process for drying and postcondensing polycondensate pellets in the solid phase, by
   a. in one or more devices, drying the polycondensate pellets and heating the same at between a minimum temperature of 105–120° C. and a maximum temperature 2° C. below their softening point,
   b. then treating the same in a holding device, and
   c. then cooling the same in a cooling device, which comprises selecting at least as the device(s) in stage a an apparatus (1) having a cuboid base unit (2) with a feed (3) for the polycondensate pellets in its upper part and an outlet (4) in its lower part, with a feed (5) on one lateral surface and with an exhaust (6) on the opposite lateral surface of the cuboid base unit (2) for the stream of inert gas, and also with distribution and retention equipment (7, 8) in the region of the feed (5) and, respectively, of the exhaust (6) for the stream of inert gas, where each of these pieces of equipment extends essentially over the entire vertical cross section of the cuboid base unit (2) and using as holding device in stage b a tower dryer with inactive tower.

2. A process as claimed in claim 1, wherein as cooling device in stage c an apparatus (1) is used with a cuboid base unit (2) with a feed (3) for the polycondensate pellets in its upper part and an outlet (4) in its lower part, with a feed (5) on one lateral surface and with an exhaust (6) on the opposite lateral surface of the cuboid base unit (2) for the stream of inert gas, and also with distribution and retention equipment (7, 8) in the region of the feed (5) and, respectively, of the exhaust (6) for the stream of inert gas, where each of these pieces of equipment extends essentially over the entire vertical cross section of the cuboid base unit (2).

3. A system for drying and postcondensing polycondensate pellets in the solid phase by a process as claimed in claim 1 with at least one apparatus (1) with a cuboid base unit (2) with a feed (3) for the polycondensate pellets in its upper part and an outlet (4) in its lower part with a feed (5) on one lateral surface and with an exhaust (6) on the opposite lateral surface of the cuboid base unit (2) for the stream of inert gas, and also with distribution and retention equipment (7, 8) in the region of the feed (5) and, respectively, of the exhaust (6) for the stream of inert gas, where each of these pieces of equipment extends essentially over the entire vertical cross section of the cuboid base unit (2), for drying and heating the polycondensate pellets used, with a holding device connected thereto, and also with a cooling service.

4. A system as claimed in claim 3, wherein the cooling device is an apparatus (1) with a cuboid base unit (2) with a feed (3) for the polycondensate pellets in its upper part and an outlet (4) in its lower part, with a feed (5) on one lateral surface and with an exhaust (6) on the opposite lateral surface of the cuboid base unit (2) for the stream of inert gas, and also with distribution and retention equipment (7, 8) in the region of the feed (5) and, respectively, of the exhaust (6) for the stream of inert gas, where each of these pieces of equipment extends over the entire vertical cross section of the cuboid base unit (2).

5. A system as claimed in claim 3, wherein the holding device is a tower dryer with inactive tower.

6. A method of using the system as claimed in claim 3, or of the process for drying and postcondensing polycondensate pellets, in particular polyester pellets or polyamide pellets, particularly preferably nylon-6 pellets.

* * * * *